United States Patent

(12) United States Patent
Ogura (10) Patent No.: US 8,003,191 B2
(45) Date of Patent: Aug. 23, 2011

(54) HONEYCOMB STRUCTURE

(75) Inventor: Yutaka Ogura, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 112 days.

(21) Appl. No.: 12/497,214

(22) Filed: Jul. 2, 2009

(65) Prior Publication Data

US 2010/0035020 A1    Feb. 11, 2010

(30) Foreign Application Priority Data

Aug. 7, 2008  (JP) ................................. 2008-204286

(51) Int. Cl.
*B32B 3/12*    (2006.01)
*B01D 50/00*   (2006.01)

(52) U.S. Cl. ... 428/116; 428/117; 428/118; 502/527.15; 502/527.16; 502/527.17; 422/180; 422/181

(58) Field of Classification Search ........................ None
See application file for complete search history.

(56) References Cited

U.S. PATENT DOCUMENTS

| 2005/0166729 | A1 | 8/2005 | Nishio et al. |
| 2007/0059483 | A1 * | 3/2007 | Fujita et al. .................... 428/116 |
| 2008/0202087 | A1 * | 8/2008 | Ohno et al. ...................... 55/524 |

FOREIGN PATENT DOCUMENTS

| EP | 1 591 431 A1 | 11/2005 |
| EP | 1 704 908 A1 | 9/2006 |
| EP | 1 965 047 A1 | 9/2008 |
| JP | A-2003-291054 | 10/2003 |

* cited by examiner

*Primary Examiner* — Gordon R Baldwin
(74) *Attorney, Agent, or Firm* — Oliff & Berridge, PLC (57) ABSTRACT

Disclosed is a honeycomb structure capable of preventing the generation of cracks in buffer portions and preventing the honeycomb structure from being divided when an operation (regeneration) of burning collected particulate matters is repeated. A honeycomb structure 100 includes a plurality of honeycomb segments 4 having partition walls 2 separating and forming a plurality of cells, and protruding walls 3 which are provided so as to protrude externally from partition walls 2a forming side surfaces 5 of the segments. The plurality of honeycomb segments 4 are arranged adjacent to one another so that the side surfaces 5 of the honeycomb segments face each other with a predetermined distance being left therebetween, each buffer portion 11 is disposed between the adjacent honeycomb segments 4 to join the honeycomb segments 4 together, and an outer peripheral portion 13 is disposed on an outermost periphery 12.

9 Claims, 5 Drawing Sheets

HONEYCOMB STRUCTURE

BACKGROUND OF THE INVENTION

1. Field of the Invention

The present invention relates to a honeycomb structure. More particularly, it relates to a honeycomb structure capable of preventing the development of cracks generated in buffer portions and preventing the honeycomb structure from being divided when an operation (regeneration) of burning collected particulate matters is repeated.

2. Description of the Related Art

A honeycomb structure made of a ceramic material having excellent thermal resistance and corrosion resistance is employed as a carrier for a catalyst device or a filter which is used for environmental protection, the collection of a specific substance or the like in various fields of chemistry, power, steel and the like. Especially in recent years, the honeycomb structure has been a plugged honeycomb structure. Cell openings at both end surfaces of the structure are alternately plugged. The structure has often been used as a diesel particulate filter (DPF) which collects particulate matters (PM) discharged from a diesel engine or the like. Moreover, as a material of the honeycomb structure for use in the atmosphere of a corrosive gas at a high temperature, silicon carbide (SiC), cordierite, aluminum titanate (AT) or the like is preferably used, because the material has excellent thermal resistance and chemical stability.

Silicon carbide has a comparatively large coefficient of thermal expansion. Therefore, when a large honeycomb structure formed by using silicon carbide as an aggregate is used, a defect is generated owing to thermal shock sometimes. Moreover, the defect is generated owing to the thermal shock sometimes when the collected particulate matters are burnt and removed. In consequence, when the honeycomb structure having a predetermined size or more is manufactured by using silicon carbide as the aggregate, a plurality of small segments of the plugged honeycomb structure are usually prepared, and joined together to prepare a large joined article, and the outer periphery of the article is roughly processed and ground, to form the plugged honeycomb structure having a desired shape such as a cylindrical shape (see, e.g., JP-A-2003-291054). It is to be noted that the segments are joined together by using a joining material. The side surfaces (the outer peripheral surfaces) of predetermined segments are coated with the joining material, and the side surfaces of the segments are joined to one another.

SUMMARY OF THE INVENTION

Such a honeycomb structure formed by joining the side surfaces of the segments to one another by the joining material (buffer portions) has a problem that when the structure is used as the DPF and repeatedly subjected to an operation (regeneration) of burning the collected particulate matters, cracks are generated in the joining material (the buffer portions) owing to repeated heating and cooling, and further the honeycomb structure is divided into segments sometimes.

The present invention has been developed in view of the above problem, and an object thereof is to provide a honeycomb structure capable of preventing the development of cracks generated in buffer portions and preventing the honeycomb structure from being divided when an operation (regeneration) of burning collected particulate matters is repeated.

To achieve the above object, according to the present invention, the following honeycomb structure is provided.

[1] A honeycomb structure comprising a plurality of honeycomb segments having partition walls separating and forming a plurality of cells functioning as fluid passages and extending from one end surface of each segment to the other end surface thereof, and protruding walls which are provided so as to protrude externally from the partition walls forming side surfaces of the segments and which extend from one end of each segment to the other end thereof in a central axis direction, wherein the plurality of honeycomb segments are arranged adjacent to one another so that the side surfaces of the honeycomb segments face each other with a predetermined distance being left therebetween, each buffer portion is disposed between the adjacent honeycomb segments to join the honeycomb segments together, and an outer peripheral portion is disposed on the outermost periphery of the plurality of joined honeycomb segments.

[2] The honeycomb structure according to [1], wherein in a section crossing the central axis direction at right angles, a distance between the tip of each protruding wall and the closest portion of the adjacent honeycomb segment is in a range of 5 to 95% of a distance between the honeycomb segment provided with the protruding walls and the adjacent honeycomb segment.

[3] The honeycomb structure according to [1] or [2], wherein each of the protruding walls has a thickness of 0.2 to 1.5 mm.

[4] The honeycomb structure according to any one of [1] to [3], wherein the opening ends of the predetermined cells on one side of each honeycomb segment and the opening ends of the remaining cells on the other side thereof have plugging portions.

According to the honeycomb structure of the present invention, each honeycomb segment has the externally protruding walls on the side surface thereof, and hence the walls for reinforcement are formed in the buffer portions. Therefore, even when a tensile stress and a compressive stress are alternately applied to the buffer portions by repeating the regeneration, the protruding walls perform a reinforcement function, whereby cracks can be prevented from being generated in the buffer portions, and the honeycomb structure can be prevented from being divided.

DESCRIPTION OF REFERENCE NUMERALS

1: cell, 2: partition wall, 2a: partition wall forming the side surface, 3: protruding wall, 4: honeycomb segment, 5: side surface, 6: void portion, 11: buffer portion, 12: outermost periphery, 13: outer peripheral portion, 21: link partition wall, 22: thin partition wall, 23: protruding wall forming portion, 31: one end surface, 32: the other end surface, 33: vibration jig, 34: honeycomb segment, 35: portion on which the vibration jig abuts, 100: honeycomb structure, 210: formed honeycomb article, 215: fired honeycomb article, 220: fired and disconnected honeycomb article, 230: fired and plugged honeycomb article, 240: honeycomb structure, L: distance, L1: length of the thin partition wall, W: thickness of the protruding wall forming portion, T: distance, and T1: length of the link partition wall.

DESCRIPTION OF THE PREFERRED EMBODIMENT

Next, the best mode for carrying out the present invention will be described in detail with reference to the drawings, but it should be understood that the present invention is not limited to the following embodiment and that the design of the present invention is appropriately altered or improved based on the ordinary knowledge of any person skilled in the art without departing from the scope of the present invention.

Figure 1:
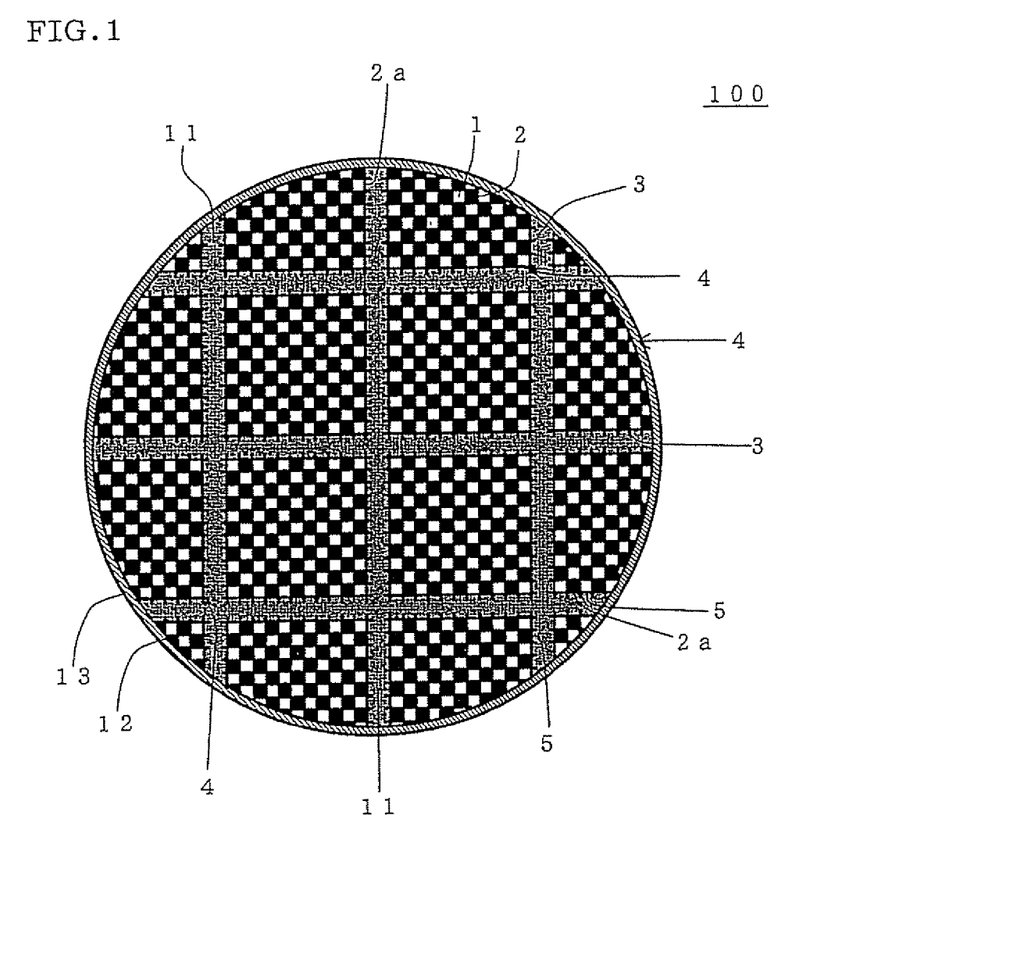
FIG. 1 is a plan view schematically showing one end surface of one embodiment of a honeycomb structure of the present invention.

As shown in FIG. 1, one embodiment of a honeycomb structure of the present invention is a honeycomb structure 100 includes a plurality of honeycomb segments 4 having partition walls 2 separating and forming a plurality of cells 1 functioning as fluid passages and extending from one end surface of each segment to the other end surface thereof, and protruding walls 3 which are provided so as to protrude externally from partition walls 2a forming side surfaces 5 of the segments and which extend from one end of each segment to the other end thereof in a central axis direction. The plurality of honeycomb segments 4 are arranged adjacent to one another so that the side surfaces 5 of the honeycomb segments 4 face each other with a predetermined distance being left therebetween, each buffer portion 11 is disposed between the adjacent honeycomb segments 4 to join the plurality of honeycomb segments 4 together via the buffer portions 11, and an outer peripheral portion 13 is disposed on the outermost periphery 12 of the plurality of joined honeycomb segments 4. FIG. 1 is a plan view schematically showing one end surface of one embodiment of the honeycomb structure of the present invention.

Thus, each honeycomb segment has the externally protruding walls 3 on the side surface 5 thereof, and hence the walls for reinforcement are formed in the buffer portions 11. Therefore, even in a case where a tensile stress and a compressive stress are alternately applied to the buffer portions 11 by repeating regeneration, when cracks are generated in the buffer portions 11, the development of the cracks can be prevented, and the honeycomb structure 100 can be prevented from being divided.

When the honeycomb structure is used as a DPF or the like, the structure is usually held and used with a holding tool made of a metal. However, when the honeycomb structure is held by the holding tool, the honeycomb structure is forced into the holding tool, and hence a pressure (the face pressure) is applied to the outer peripheral surface of the honeycomb structure by the holding tool. Moreover, by such a face pressure, the buffer portions are deformed or a joining state between each honeycomb segment and each buffer portion becomes insufficient, whereby the honeycomb structure is deformed sometimes. On the other hand, in the honeycomb structure of the present invention, each honeycomb segment has the externally protruding walls on the side surface thereof. Therefore, even when the honeycomb structure is compressed by the holding tool and the face pressure is applied to the structure, the presence of the protruding walls can prevent the buffer portions form being deformed and can prevent the joining state between the honeycomb segment and the buffer portion from being deteriorated, whereby the deformation of the honeycomb structure can be prevented.

Figure 2:
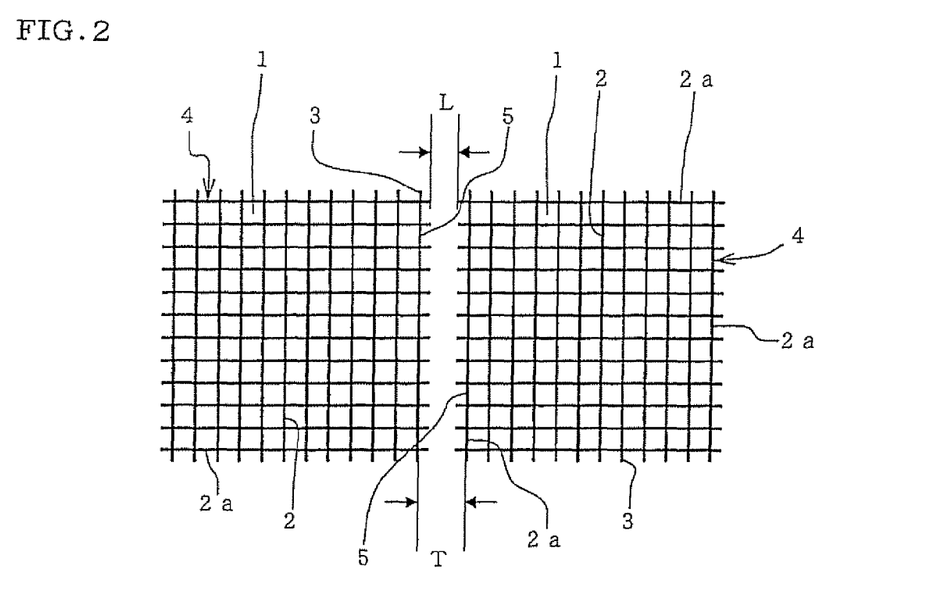
FIG. 2 is a schematic diagram showing the sections of two adjacent honeycomb segments crossing a central axis direction at right angles in the embodiment of the honeycomb structure of the present invention.
Figure 3:
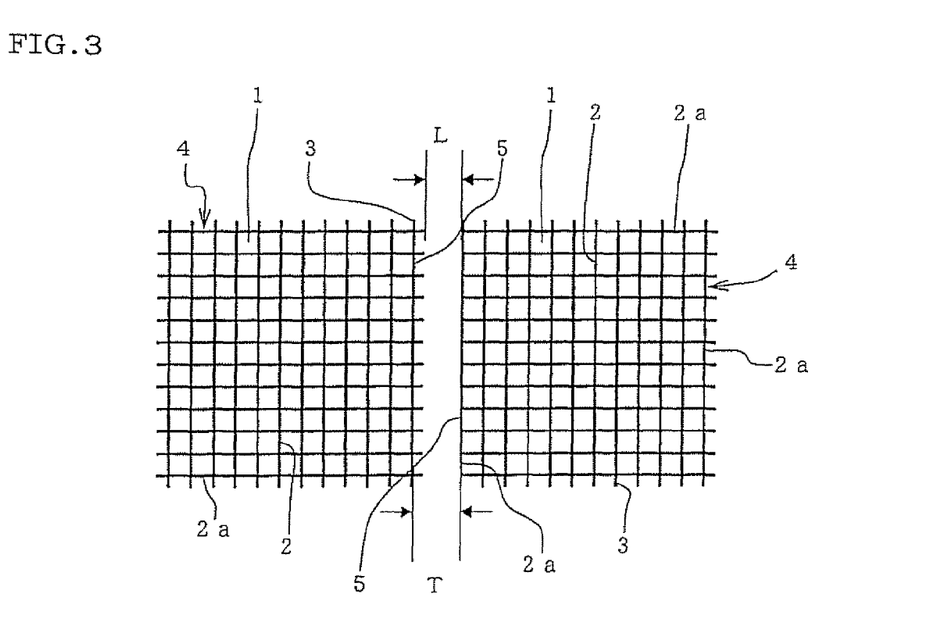
FIG. 3 is a schematic diagram showing the sections of the two adjacent honeycomb segments crossing the central axis direction at right angles in the embodiment of the honeycomb structure of the present invention.

In the section of the honeycomb structure of the present embodiment crossing the central axis direction at right angles, a distance between the tip of each protruding wall and the closest portion of the adjacent honeycomb segment 4 is in a range of preferably 5 to 95%, further preferably 10 to 75% of a distance T between the honeycomb segment provided with the protruding walls and the adjacent honeycomb segment (see FIGS. 2, 3). When the distance is smaller than 5%, the buffer portions are deformed by the stress of the regeneration, the protruding walls collide with the adjacent honeycomb segment, and the honeycomb structure breaks down sometimes. When the distance is larger than 95%, the effect of the prevention of the development of the cracks in the buffer portions and the dividing of the honeycomb structure decreases sometimes. Here, "the distance T between the honeycomb segment provided with the protruding walls and the adjacent honeycomb segment" is a distance between the side surface of the honeycomb segment provided with the protruding walls and the facing side surface of the adjacent honeycomb segment.

In a case where as shown in, for example, FIG. 2, two honeycomb segments 4, 4 are arranged adjacent to each other and the protruding walls 3 are formed on the side surfaces 5, 5 of both the honeycomb segments 4, 4 facing each other, "the distance T between the tips of the protruding walls 3 and the closest portion of the adjacent honeycomb segment 4" is a distance between the tips of the protruding walls 3 of the one honeycomb segment and the tips of the protruding walls 3 of the other honeycomb segment disposed so as to face the one honeycomb segment. Moreover, as shown in FIG. 3, in a case where two honeycomb segments 4, 4 are arranged adjacent to each other, the facing side surface 5 of the one honeycomb segment 4 is provided with the protruding walls 3 and the facing side surface 5 of the other honeycomb segment 4 is not provided with any protruding wall 3, "a distance L between the tips of the protruding walls 3 and the closest portion of the adjacent honeycomb segment 4" is a distance between the tips of the protruding walls 3 of the one honeycomb segment 4 and the side surface 5 of the other honeycomb segment 4. FIG. 2 is a schematic diagram showing the sections of the two adjacent honeycomb segments crossing the central axis direction at right angles in the embodiment of the honeycomb structure of the present invention. FIG. 3 is a schematic diagram showing the sections of the two adjacent honeycomb segments crossing the central axis direction at right angles in the embodiment of the honeycomb structure of the present invention.

The distance between the adjacent honeycomb segments (a predetermined distance between the facing side surfaces) is preferably 0.3 to 3.0 mm, further preferably 1.0 to 1.5 mm. When the distance is smaller than 0.3 mm, the buffer portions are deformed by the stress of the regeneration, and the side surfaces collide with each other sometimes. In a case where the distance is larger than 3.0 mm, a pressure loss increases sometimes when an exhaust gas flows through the honeycomb structure.

In the honeycomb structure of the present embodiment, each of the protruding walls 3 has a thickness of preferably 0.2 to 1.5 mm, further preferably 1.0 to 1.5 mm. When the thickness is smaller than 0.2 mm, the strength of each protruding wall 3 decreases, and the effect of the prevention of the crack development decreases sometimes. When the thickness is larger than 1.5 mm, the effect of the relaxing of the deformation in a compressive direction during the regeneration decreases, and ring-off-cracks are easily generated sometimes.

In the honeycomb structure of the present embodiment, as shown in FIG. 1, the opening ends of the predetermined cells on one side of each honeycomb segment and the opening ends of the remaining cells on the other side thereof preferably have plugging portions. Furthermore, the predetermined cells and remaining cells having such plugging portions are preferably alternately disposed so as to form checkered patterns in the end surfaces of the honeycomb structure.

In the honeycomb structure of the present embodiment, as shown in FIGS. 1 to 3, the protruding walls 3 are preferably formed so as to extend from the partition walls of each honeycomb segment (the partition walls 2 joined to (which abut on) the side surface of the honeycomb segment provided with the protruding walls 3), but each protruding wall may be interposed between the partition wall 2 and the partition wall 2.

The number of the protruding walls 3 is preferably 50% or more of the total number of the partition walls joined to (which abut on) the side surface of the honeycomb segment provided with the protruding walls, and is further preferably equal to the total number of the partition walls joined to the side surface of the honeycomb segment provided with the protruding walls. Here, when "the number of the protruding walls is equal to the total number of the partition walls joined to the side surface of the honeycomb segment provided with the protruding walls", as shown by each honeycomb segment in FIG. 2, the total number of the partition walls 2 joined to the side surface 5 provided with the protruding walls is 12, whereas the number of the protruding walls is 12. Moreover, when "the number of the protruding walls is 50% of the total number of the partition walls joined to the side surface of the honeycomb segment provided with the protruding walls", in, for example, the honeycomb segment provided with 12×12 partition walls (the number of the partition walls is equal to that in the honeycomb segment shown in FIG. 2), the total number of the partition walls 2 joined to the side surface 5 provided with the protruding walls is 12, whereas the number of the protruding walls is 6.

There is not any special restriction on the whole shape of the honeycomb structure of the present embodiment, and examples of the shape include desired shapes such as a cylindrical shape and an oval shape. Moreover, as to the size of the honeycomb structure having, for example, the cylindrical shape, the diameter of the bottom surface of the structure is preferably 50 to 450 mm, further preferably 100 to 350 mm. Moreover, the length of the honeycomb structure in the central axis direction is preferably 50 to 450 mm, further preferably 100 to 350 mm. As the material of the honeycomb structure, a ceramic material is preferable. In view of excellent strength and thermal resistance, the material is further preferably at least one selected from the group consisting of silicon carbide, a silicon-silicon carbide based composite material, cordierite, mullite, alumina, spinel, a silicon carbide-cordierite based composite material, lithium aluminum silicate, aluminum titanate and an iron-chromium-aluminum based alloy. Among them, silicon carbide or the silicon-silicon carbide based composite material is especially preferable. Silicon carbide has a comparatively large coefficient of thermal expansion. Therefore, when a large honeycomb structure formed by using silicon carbide as an aggregate is used, a defect is generated owing to thermal shock sometimes. However, the honeycomb structure of the present invention is a structure in which a plurality of honeycomb segments are arranged via a void portion and the void portion is provided with a buffer portion. Therefore, the thermal expansion of silicon carbide is buffered by the buffer portion, and the generation of the defect of the honeycomb structure can be prevented.

The honeycomb structure of the present embodiment is preferably porous. The honeycomb structure has an open pore ratio of preferably 30 to 80%, further preferably 40 to 65%. When the open pore ratio is set to such a range, the pressure loss can be decreased while maintaining the strength. When the open pore ratio is less than 30%, the pressure loss increases sometimes. When the open pore ratio exceeds 80%, the strength decreases, or thermal conductivity decreases sometimes. The open pore ratio is a value measured by Archimedes process.

The honeycomb structure of the present embodiment has an average pore diameter of preferably 5 to 50 µm, further preferably 7 to 35 µm. When the average pore diameter is set to such a range, particulate matters (PM) can effectively be collected. When the average pore diameter is less than 5 µm, the structure is easily clogged with the particulate matters (PM) sometimes. When the average pore diameter exceeds 50 µm, the particulate matters (PM) are not collected by the filter, but pass through the filter. The average pore diameter is a value measured by a mercury porosimeter.

When the material of the honeycomb structure of the present embodiment is silicon carbide, silicon carbide particles have an average particle diameter of preferably 5 to 100 µm. When the average particle diameter is set to such a range, it is possible to obtain an advantage that the structure can easily be controlled so as to have porosity or pore diameters suitable for the filter. When the average particle diameter is smaller than 5 µm, the pore diameters become excessively small. When the average particle diameter is larger than 100 µm, the porosity becomes excessively large. When the pore diameters are excessively small, the structure is easily clogged with the particulate matters (PM) sometimes. When the porosity is excessively large, the pressure loss increases sometimes. The average particle diameter of the material is a value measured in conformity to JIS R 1629.

There is not any special restriction on the cell shape of the honeycomb segment constituting the honeycomb structure of the present embodiment (the cell shape in the section of the honeycomb structure vertical to the central axis direction (a cell extending direction)), and examples of the shape include a triangular shape, a quadrangular shape, a hexagonal shape, an octagonal shape, a circular shape and a combination of them. Each of the partition walls of the honeycomb segment constituting the honeycomb structure has a thickness of preferably 50 to 2000 µm. When the thickness of the partition wall is smaller than 50 µm, the strength of the honeycomb structure decreases sometimes. When the thickness is larger than 2000 µm, the pressure loss increases sometimes. There is not any special restriction on the cell density of the honeycomb segment constituting the honeycomb structure, but the density is preferably 0.9 to 311 cells/cm$^2$, further preferably 7.8 to 62 cells/cm$^2$.

Moreover, in the section of the honeycomb structure of the present embodiment crossing the central axis direction at right angles, the number of the arranged honeycomb segments is preferably 4 to 144, further preferably 16 to 100. As to the size of the honeycomb segment, the section of the segment crossing the central axis at right angles has an area of preferably 3 to 16 cm$^2$, further preferably 7 to 13 cm$^2$. When the area is smaller than 3 cm$^2$, the pressure loss when the gas circulates through the honeycomb structure increases sometimes. When the area is larger than 16 cm$^2$, the effect of the prevention of the breakdown of the honeycomb segment decreases sometimes.

The buffer portion 11 constituting the honeycomb structure of the present embodiment is preferably charged into the whole space of the void portion formed between the honeycomb segments. The buffer portion has a thickness of preferably 0.3 to 3.0 mm, further preferably 1.0 to 1.5 mm. When the thickness is smaller than 0.3 mm, a resistance to thermal shock deteriorates sometimes. When the thickness is larger than 3.0 mm, the pressure loss increases sometimes. The plurality of honeycomb segments are joined together via the buffer portions.

The outer peripheral portion of the honeycomb structure of the present embodiment is disposed in the outermost peripheral portion of the whole structure of the plurality of honeycomb segments joined together via the buffer portions. The outer peripheral portion of the honeycomb structure of the present embodiment has a thickness of preferably 0.1 to 4.0 mm, further preferably 0.3 to 1.0 mm. In a case where the thickness is smaller than 0.1 mm, when the outer periphery of the structure is coated, cracks are easily generated sometimes. When the thickness is larger than 4.0 mm, a pressure increases sometimes. The thickness of the outer peripheral portion is a distance between the outermost peripheral surface of the outer peripheral portion and the cells at a position closest to the outermost peripheral surface.

Moreover, the honeycomb segment constituting the honeycomb structure of the present embodiment has a thermal expansion coefficient of $1\times10^{-6}/°$ C. or more, further preferably $2\times10^{-6}$ to $7\times10^{-6}/°$ C. Even when the coefficient of thermal expansion is large in this manner, the honeycomb structure of the present embodiment is a honeycomb structure having a high resistance to thermal shock.

Next, a manufacturing method of the embodiment of the honeycomb structure of the present invention will be described.

(1) Preparation of Formed Honeycomb Article:

First, a binder, a surfactant, a pore former, water or the like is added to a ceramic material, thereby obtaining a forming material. The ceramic material is preferably at least one selected from the group consisting of silicon carbide, a silicon-silicon carbide based composite material, cordierite, mullite, alumina, spinel, a silicon carbide-cordierite based composite material, lithium aluminum silicate, aluminum titanate and an iron-chromium-aluminum based alloy. Among them, silicon carbide or the silicon-silicon carbide based composite material is preferable. In the case of the silicon-silicon carbide based composite material, a mixture of silicon carbide powder and metal silicon powder is used as the ceramic material. The content of the ceramic material is preferably 70 to 94 mass % of the whole forming material.

Examples of the binder include methyl cellulose, hydroxypropoxyl cellulose, hydroxyethyl cellulose, carboxymethyl cellulose, and polyvinyl alcohol. Among them, methyl cellulose and hydroxypropoxyl cellulose are preferably used together. The content of the binder is preferably 1 to 20 mass % of the whole forming material.

The content of the water is preferably 18 to 45 mass % of the whole forming material.

As the surfactant, ethylene glycol, dextrin, fatty acid soap, polyalcohol or the like may be used. They may be used alone or as a combination of two or more of them. The content of the surfactant is preferably 5 mass % or less of the whole forming material.

There is not any special restriction on the pore former as long as pores are formed after firing, and examples of the pore former include starch, resin balloon, water-absorbing resin, and silica gel. The content of the pore former is preferably 15 mass % or less of the whole forming material.

Next, the forming material is kneaded to form a kneaded clay. There is not any special restriction on a method of kneading the forming material to form the kneaded clay, and examples of the method include methods using a kneader, a vacuum clay kneader and the like.

Figure 4:
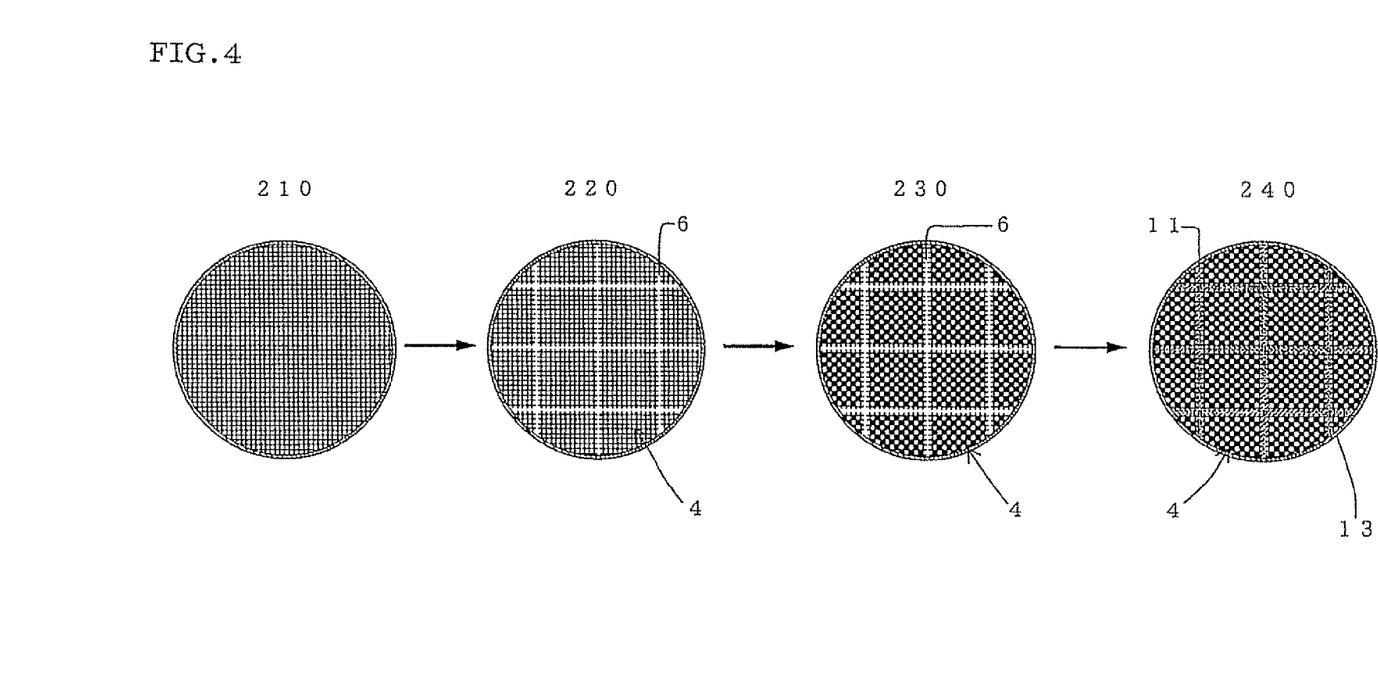
FIG. 4 is a schematic diagram showing the process of the formation of a honeycomb structure in a manufacturing method of the embodiment of the honeycomb structure of the present invention.

Next, the kneaded clay is extruded and formed into a formed honeycomb article 210 as shown in FIG. 4. During the extrusion, it is preferable to use a die having desired segment shape, segment arrangement, link rib shape, cell shape, partition wall thickness, cell density and the like. As the material of the die, a hard metal which is not easily worn is preferable. The formed honeycomb article 210 include partition walls to define and form a plurality of cells which become through channels and which extend from one end surface of the article to the other end surface thereof, and an outer peripheral portion which surrounds the outermost periphery of the article. FIG. 4 is a schematic diagram showing the process of the formation of the honeycomb structure in the manufacturing method of the embodiment of the honeycomb structure of the present invention.

Figure 5:
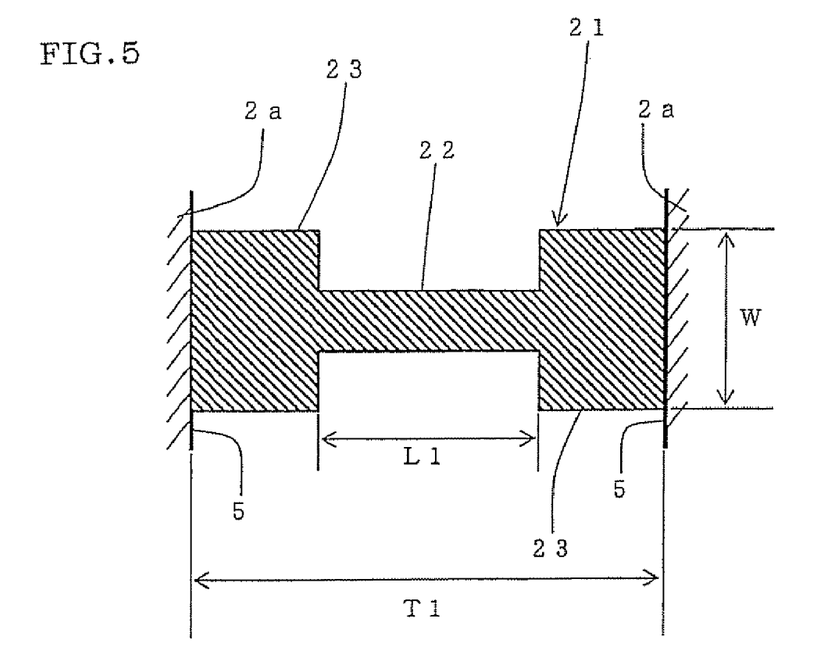
FIG. 5 is an enlarged schematic diagram showing a partition wall (a link partition wall) to be broken down later in the section of a formed honeycomb article crossing the central axis direction at right angles.

In the subsequent step (a step of preparing a fired honeycomb article and/or a step of forming a fired and disconnected honeycomb article), a part of partition walls of the formed honeycomb article 210 is broken down by firing or vibration, whereby a segment-connected formed honeycomb article 220 is formed as shown in FIG. 4. In this case, among the partition walls of the formed honeycomb article 210, each partition wall (the link partition wall), disposed at the position of a space (the void portion) formed between the segments of the segment-connected formed honeycomb article 220 formed in the subsequent step, breaks down. Therefore, a partition wall (a link partition wall) 21 to be broken down is formed into a partially thin shape as shown in FIG. 5, and this portion is preferably easily broken down. FIG. 5 is an enlarged schematic diagram showing the partition wall (the link partition wall) 21 to be broken down later in the section of the formed honeycomb article 210 crossing the central axis direction at right angles.

As shown in FIG. 5, the link partition wall 21 is constituted of a thin partition wall 22 having a small thickness and a protruding wall forming portion 23 forming a protruding wall after the breakdown of the thin partition wall 22. Moreover, a partition wall provided with the link partition wall 21 is the partition wall 2a which forms the side surface of the honeycomb segment after the breakdown of the thin partition wall 22. A length L1 of the thin partition wall 22 (the length in the section crossing the central axis direction at right angles) becomes "the distance L between the tip of the protruding wall 3 and the closest portion of the adjacent honeycomb segment 4" after the breakdown of the thin partition wall 22. A length T1 of the link partition wall 21 (the length in the section crossing the central axis direction at right angles) becomes "the distance T between the honeycomb segment provided with the protruding walls and the adjacent honeycomb segment" after the breakdown of the thin partition wall 22. Therefore, the length L1 of the thin partition wall 22 is preferably 5 to 95%, further preferably 50 to 75% of the length T1 of the link partition wall 21. Moreover, the thickness of the protruding wall forming portion 23 is preferably 0.2 to 1.5 mm, further preferably 1.0 to 1.5 mm in the same manner as in the resultant protruding wall. The thickness of the thin partition wall 22 is preferably 0.1 to 0.15 mm, further preferably 0.12 to 0.14 mm. In a case where the thickness is smaller than 0.1 mm, when the formed honeycomb article is formed, the wall is deformed sometimes. When the thickness of the thin partition wall is larger than 0.15 mm, the wall is not easily broken down sometimes.

There is not any special restriction on the position of the thin partition wall 22 in the link partition wall 21 as long as a desired protruding wall is formed. When, for example, the honeycomb segments 4 shown in FIG. 2 are formed, the thin partition wall 22 is formed preferably in the center of the link partition wall 21. In consequence, the length of each protruding wall that is formed on the facing side surface of the adjacent honeycomb segment is an approximately equal length. Moreover, when, for example, the honeycomb segments 4 shown in FIG. 3 are formed, in the sections of the segments crossing the central axis direction, one end of the thin partition wall is preferably directly joined to the partition wall 2a forming the side surface of the segment. In this case, the other end of the thin partition wall is joined to the protruding wall forming portion, and the protruding wall forming portion is joined to the partition wall 2a forming the side surface of the segment.

The section of the formed honeycomb article 210 crossing the central axis direction at right angles has an area in a range of preferably 19 to 1590 cm². Since the honeycomb structure of the present invention has a high resistance to thermal shock, such a sectional area of the structure can be increased.

In consideration of contraction during drying or firing, the partition wall thickness, cell density, outer peripheral portion thickness and the like of the formed honeycomb article can appropriately be determined in accordance with the honeycomb structure of the present invention to be prepared.

The resultant formed honeycomb article is preferably dried before fired. There is not any special restriction on a drying method, and examples of the method include electromagnetic heating systems such as microwave heating drying and high-frequency dielectric heating drying and external heating systems such as hot air drying and superheated vapor drying. Among them, the article is preferably dried as much as the constant amount of water by the electromagnetic heating system, and then as much as the remaining water by the external heating system, so that the whole formed article can immediately and uniformly be dried without being cracked. As drying conditions, with respect to the amount of the water before the drying, 30 to 90 mass % of water is removed by the electromagnetic heating system, and then the water is decreased to 3 mass % or less of water by the external heating system. The dielectric heating drying is preferable as the electromagnetic heating system, and the hot air drying is preferable as the external heating system.

Moreover, when the length of the formed honeycomb article in the central axis direction is not a desired length, both end surfaces (both ends) of the article are preferably cut so as to obtain the desired length. There is not any special restriction on a cutting method, but examples of the method include a method using a disc saw cutter or the like.

(2) Preparation of Fired Honeycomb Article:

Subsequently, the formed honeycomb article 210 is preferably fired to prepare a fired honeycomb article. Calcinating is preferably performed before the firing, to remove the binder and the like. The calcinating is preferably performed in the atmosphere at 400 to 500° C. for 0.5 to 20 hours. There is not any special restriction on a calcinating and firing method, and the firing may be performed by using an electric furnace, a gas furnace or the like. As the firing conditions, the article is preferably heated in the inactive atmosphere of nitrogen or argon at 1300 to 1500° C. for one to 20 hours. During the firing, a part or all of the thin partition wall 22 (see FIG. 5) of the link partition wall 21 (see FIG. 5) may be broken down.

(3) Formation of Fired and Disconnected Honeycomb Article

Figure 6A:
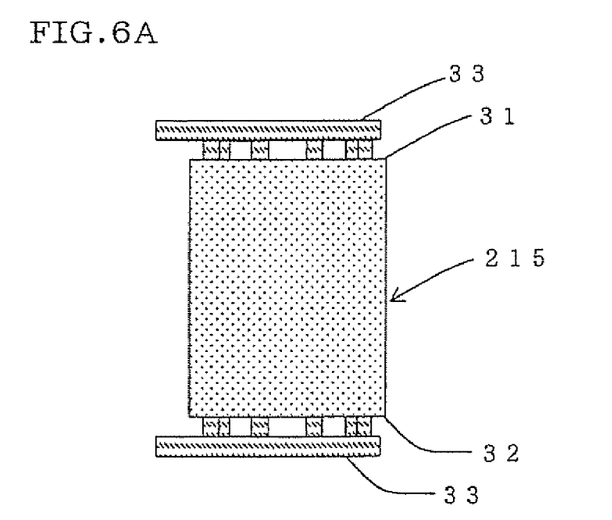
FIG. 6A is a side view schematically showing a state in which both end surfaces of a fired honeycomb article are grasped by a vibration jig.
Figure 6B:
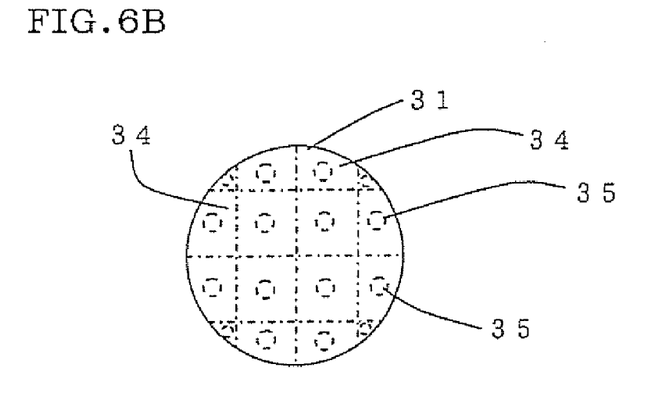
FIG. 6B is a plan view showing portions of one end surface of the fired honeycomb article on which the vibration jig abuts and schematically showing the fired honeycomb article from the side of the one end surface.

Next, the thin partition wall 22 (see FIG. 5) of the link partition wall 21 (see FIG. 5) of the resultant fired honeycomb article is broken down to prepare the fired and disconnected honeycomb article 220. There is not any special restriction on a method of breaking down the thin partition wall, but as shown in, for example, FIGS. 6A, 6B, a fired honeycomb article 215 is grasped by vibration jigs 33 so as to sandwich both end surfaces 31, 32 of the article between the jigs, and the fired honeycomb article 215 is preferably vibrated by the vibration jigs 33, whereby the thin partition walls are broken down. When the fired honeycomb article 215 is grasped by the vibration jigs 33, both end surfaces of each honeycomb segment 34 are sandwiched between the vibration jigs 33, whereby all the honeycomb segments are preferably grasped by the vibration jigs 33. Thus, when all the honeycomb segments 34 are grasped and vibrated by the vibration jigs 33 in this manner, the thin partition walls can efficiently be broken down. Moreover, after the breakdown of the thin partition walls, the honeycomb segments 34 are not scattered but the arrangement of the honeycomb segments linked to one another by the link partition walls can be kept. Moreover, in this state, the buffer portions can easily be formed, and production efficiency can be increased. FIG. 6A is a side view schematically showing a state in which both the end surfaces 31, 32 of the fired honeycomb article 215 are grasped by the vibration jigs 33. FIG. 6B is a plan view showing portions 35 of the one end surface 31 of the fired honeycomb article on which the vibration jig 33 abuts and schematically showing the fired honeycomb article 215 from the side of the one end surface 31.

When the fired honeycomb article is vibrated by the vibration jig 33, the vibration jig is preferably vibrated in parallel with the end surface of the fired honeycomb article so that the honeycomb segments reciprocate. The amplitude of the vibration is preferably 0.01 to 10 mm. The material of the portions of the vibration jig which abuts on the honeycomb segments is preferably rubber or the like.

Examples of a method of breaking down the link partition walls (the thin partition walls) without using any vibration jig include a method of cutting the partition walls by a cutting device, and a method of lightly hitting the partition walls with a hammer or the like to break down link ribs only. As the cutting device, an ultrasonic vibration blade system, a low frequency vibration blade system or the like is preferably used. To perform cut processing by the vibration blade system, the tip of a blade in a longitudinal direction or the central axis direction is allowed to abut on the one end surface of the fired honeycomb article, the blade being a bar-like or plate-like blade extending in a longitudinal direction or a tubular blade having the same sectional shape as that of a cut (the shape of the section of the article crossing the central axis direction at right angles). Then, while ultrasonically vibrating the blade, the cut is formed in the fired honeycomb article. Since the cut is processed by using the tip of the bar-like, plate-like or tubular blade, the cut can be formed in any position of the one end surface of the fired honeycomb article.

As a processing device of the vibration blade system, for example, a trade name: Ultrasonic Processor manufactured by NDK, Incorporated may be used. Moreover, the cut processing by the low-frequency vibration blade system can be performed in the same manner as in the ultrasonic vibration blade system. As to a difference between the ultrasonic vibration blade system and the low-frequency blade system, the blade is ultrasonically vibrated in the ultrasonic blade system, whereas the blade is vibrated by an eccentric motor, a cam mechanism, an eccentric spindle mechanism or the like in the low-frequency vibration blade system. It is to be noted that when the partition walls are cut by the cutting device, each link partition wall may be provided with the thin partition wall to facilitate the cutting, but the thin partition wall may not be formed, or the link partition wall may have the same shape as that of another partition wall. The link partition wall is provided with the thin partition wall. This is because when the link partition wall is broken down by the vibration, the thin partition wall is disposed at a desired position, whereby the link partition wall is broken down at the desired position. It is to be noted that the thin partition wall may be broken down before firing the formed honeycomb article.

(4) Formation of Fired and Plugged Honeycomb Article:

Next, openings of predetermined cells in one end surface of the fired and disconnected honeycomb article and openings of the remaining cells in the other end surface thereof are preferably provided with plugging portions, to form a fired and plugged honeycomb article 230. Furthermore, the predetermined cells and remaining cells provided with the plugging portions are alternately arranged as described above, to further preferably form a checkered pattern in each end surface as shown in FIG. 4. When the fired and plugged honeycomb article 230 is formed, the resultant honeycomb structure is a plugged honeycomb structure. There is not any special restriction on a method of forming the plugging portions, but examples of the method include the following method. A sheet is attached to the one end surface of the fired and disconnected honeycomb article, and holes are made in positions of the sheet corresponding to the cells to be provided with the plugging portions. Then, the end surface of the fired and disconnected honeycomb article provided with the sheet is immersed into a plugging slurry made of a plugging portion constituting material, and the plugging slurry is charged into opening ends of the cells to be provided with the plugging portions through the holes made in the sheet. Then, as to the other end surface of the fired and disconnected honeycomb article, the plugging portions are formed in the cells which do not have any plugging portion in the one end surface of the article in the same manner as in the method of forming the plugging portions in the one end surface of the article (the plugging slurry is charged). The same material as that of the formed honeycomb article is preferably used as the plugging portion constituting material. The plugging portions are formed, and then firing is preferably performed on conditions similar to the above firing conditions.

The plugging portions may be formed before firing the formed honeycomb article, or may be formed after preparing the fired honeycomb article and before forming the fired and disconnected honeycomb article.

(5) Preparation of Honeycomb Structure:

A joining material is charged into a void portion 6 formed between the adjacent honeycomb segments of the fired and plugged honeycomb article 230 to form the buffer portion 11, thereby obtaining a honeycomb structure 240 formed by joining the plurality of honeycomb segments together via the buffer portion. The buffer portion 11 is preferably formed in the whole void portion. The buffer portion 11 performs a function of buffering (absorbing) a volume change when the honeycomb segment thermally expands or contracts, and performs a function of joining the honeycomb segments together. Examples of a method of forming the buffer portion 11 include a method of charging a slurry of a filling material obtained by dispersing the material in a dispersion medium such as water into the cut of the void portion. This is because when the fired honeycomb article 215 is grasped by the vibration jig 33 as shown in FIG. 6A, even after the breakdown of the link ribs, the void portion having a constant thickness (width) is held by the vibration jig 33. At this time, the thickness of the void portion held by the vibration jig 33 is the thickness of the buffer portion 11. When the slurry is charged into the void portion, the fired and plugged honeycomb article 230 made immobile by the vibration jig is put in a sealed container, and a tape or the like is preferably wound around the outer periphery of the article so that the slurry does not leak from the outer periphery of the article. When the fired and plugged honeycomb article 230 has a large size, the slurry is charged into a plurality of portions of the article, whereby the slurry can be charged without applying any high pressure. Examples of the material of the tape wound around the outer periphery of the fired and plugged honeycomb article 230 include a material such as polyester which is impermeable to water. In this case, when the slurry is charged into the fired and plugged honeycomb article 230 while the article is immobile, in the case of the fired and plugged honeycomb article 230 being porous, the dispersion medium is absorbed by the partition walls, and does not uniformly spread in the void portion sometimes. In such a case, the slurry is preferably forced into the void portion while vibrating the fired and plugged honeycomb article 230 by a vibration device. As the vibration device, a trade name: Small Vibration Tester manufactured by Asahi Seisakusho Co., Ltd. or the like may be used. Alternatively, the vibration may be applied by the vibration jig instead of the vibration device. Moreover, for a purpose of allowing the slurry to more easily and uniformly penetrate through the void portion, the inner wall of the void portion (the side surface of the honeycomb segment) is preferably subjected to a water repellent treatment. Examples of the water repellent treatment include a method of spraying the slurry including SiC particles. The slurry is forced into the void portion, and then the structure is preferably dried at 100° C. or more.

Furthermore, when the vibration jig 33 is used, examples of a method of forming the buffer portion 11 include a method of forming the tape of the filling material, charging a plurality of filling material tapes into the void portions and then subjecting the void portions to a heating treatment, to form the buffer portions 11. There is not any special restriction on a method of forming the tape of the filling material, and examples of the method include a method of mixing, for example, the filling material, the binder, the surfactant, water and the like to obtain the forming material and forming the tape of the material by a tape forming method. Moreover, examples of the method of forming the buffer portion 11 include a method of charging a powder-like filling material into the void portion, and then subjecting the opening of the void portion to a sealing treatment with a cement, an adhesive or the like, thereby forming the buffer portion. The powder-like filling material can be charged into the void portion by tapping.

Moreover, when the vibration jig is not used but the link partition wall is broken down and the honeycomb segments are scattered, a joining face between each honeycomb segment and the outer peripheral portion of the structure is coated with a slurry-like filling material obtained by dispersing the material into a dispersion medium such as water, or the tape-like filling material is attached to the joining face, and then the honeycomb segments and the outer peripheral portion may be joined together. In consequence, it is possible to obtain the honeycomb structure in which the void portion formed between the adjacent honeycomb segments is provided with the buffer portion.

Examples of the filling material include an inorganic fiber, colloidal silica, puddle, SiC particles, an organic binder, a resin balloon, and a slurry kneaded after adding water to a dispersant. When the tape of the filling material is formed and inserted into the void portion, as the filling material, a material which foams by a thermal treatment is used. The filling material is inserted into the void portion, and then the fired and disconnected honeycomb article is preferably heated. Examples of the material which foams by the thermal treatment include an urethane resin.

(6) Outer Periphery Coating Treatment:

The honeycomb structure is preferably formed and then subjected to an outer periphery coating treatment. When the outer periphery coating treatment is performed, the irregularities of the outer peripheral surface of the outer peripheral portion can further be decreased. Examples of the outer periphery coating treatment include a method of coating the outer peripheral portion of the honeycomb structure with an outer periphery coating material and drying the structure. As the outer periphery coating material, the mixture of the inorganic fiber, colloidal silica, puddle, SiC particles, organic binder, resin balloon, dispersant, water and the like may be used. Moreover, there is not any special restriction on a method of coating the outer peripheral portion with the outer periphery coating material, and examples of the method include a method of coating the portion with the material by use of a scraper or the like while rotating the honeycomb structure on a wheel.

As the manufacturing method of the embodiment of the honeycomb structure of the present invention, a method preferably includes the steps of forming one formed honeycomb article by extrusion and finely dividing the article to obtain a constitution in which the honeycomb segments are joined together. However, the method may include the steps of separately forming a plurality of honeycomb segments provided with the protruding walls by extrusion and joining the segments together via a joining material to obtain a constitution in which the honeycomb segments are joined together. In this case, the honeycomb segments are joined together, and then the outer peripheral portion is preferably formed on the outermost periphery of the segments.

EXAMPLES

Hereinafter, the present invention will be described more specifically in accordance with examples, but the present invention is not limited to these examples.

Example 1

As a ceramic material, SiC powder and metal Si powder were mixed at a mass ratio of 80:20, and auxiliary forming materials such as methyl cellulose and hydroxypropoxymethyl cellulose, pore formers such as starch and a water-absorbing resin, a surfactant and water were added to the resultant mixture, followed by kneading, to prepare a kneaded clay by a vacuum clay kneader.

The resultant columnar kneaded clay was formed into a cylindrical honeycomb shape by use of an extrusion forming machine, high-frequency dielectric heating drying was performed, drying was performed by using a hot air drier at 120° C. for two hours, and both end surfaces of the resultant dried article were cut as much as predetermined amounts, thereby obtaining a formed honeycomb article. Among partition walls of the formed honeycomb article, partition walls to be broken down later were link partition wall having thin partition walls. As a link partition wall forming pattern (a honeycomb segment forming pattern), like a buffer portion forming pattern in a honeycomb structure shown in FIG. 1, the link partition walls were broken down, and then three parallel void portions and three parallel void portions crossing the three void portions at right angles are formed in one end surface of a formed honeycomb article, to form a pattern provided with 16 honeycomb segments (a void portion pattern: 3×3). A distance between the void portions after breaking down the link partition walls was set to 36 mm. The thickness of each partition wall of the formed honeycomb article was set to 310 µm, the cell density was set to 46.5 cells/cm$^2$ (300 cells/square inch), the diameter of the bottom surface of the article was set to 145 mm, and the length of the article in a central axis direction was set to 155 mm. Moreover, each link partition wall had such a shape that in the section of the article crossing the central axis direction at right angles, one end of each thin partition wall was directly connected to each partition wall forming the side surface of each honeycomb segment (the other end of the thin partition wall was connected to a protruding wall forming portion). In the section of the article crossing the central axis direction at right angles, the length of the link partition wall was set to 1.00 mm, the length of the thin partition wall was set to 0.95 mm, the thickness of the thin partition wall was set to 0.10 mm, and the thickness of the protruding wall forming portion was set to 0.15 mm. In the resultant honeycomb structure, the length of the link partition wall became "a distance T between a honeycomb segment provided with protruding walls and the adjacent honeycomb segment", and the length of the thin partition wall was "a distance L between the tip of the protruding wall and the closest portion of the adjacent honeycomb segment". In the honeycomb structure of Example 1, a ratio (100×L/T(%)) of "the distance L between the tip of the protruding wall and the closest portion of the adjacent honeycomb segment" to "the distance T between the honeycomb segment provided with the protruding walls and the adjacent honeycomb segment" was 95%.

The resultant formed honeycomb article was dried at 120° C. for five hours by use of a hot air drier, degreased in the atmosphere at about 450° C. for five hours by use of an atmospheric furnace provided with a deodorizing device, and then fired in an Ar inactive atmosphere at about 1450° C. for five hours, to obtain a porous fired honeycomb article in which SiC crystal particles combined with one another by Si. The fired honeycomb article had an average pore diameter of 13 µm and a porosity of 41%. The average pore diameter was a value measured by a mercury porosimeter, and the porosity was a value measured by Archimedes process.

Link partition walls of the resultant fired honeycomb article were broken down by using a vibration jig shown in FIG. 6A (vibration breakdown) to prepare the fired and disconnected honeycomb article. As the vibration jig, a trade name: Small Vibration Tester manufactured by Asahi Seisakusho Co., Ltd. was used. A vibration time was set to 100 seconds.

In the resultant fired and disconnected honeycomb article, the ends of the adjacent cells on opposite sides were plugged, and plugging portions were formed at the ends of the cells so that both end surfaces of the article had a checkered pattern, whereby a fired and plugged honeycomb article was obtained.

A material similar to that of the formed honeycomb article was used in a filling material for plugging.

A slurry of the filling material was charged into a void portion of the fired and disconnected honeycomb article to form a buffer portion, thereby obtaining a honeycomb structure. A mixture of an aluminosilicate inorganic fiber and SiC particles was used as the filling material. As the slurry containing the filling material, there were used 100 parts by mass of filling material containing 30 parts by mass of water, 30 parts by mass of aluminosilicate inorganic fiber and 30 parts by mass of SiC particles. When the slurry was charged into the void portion, the article was put in a sealed container while honeycomb segments were made immobile by a vibration jig 33 as shown in FIG. 6A. A tape of a polyester base material (manufactured by Scotch Co.) was wound around the outer periphery of the structure so that any slurry did not leak from the outer periphery, and then the slurry was forced into the void portion. As to the resultant honeycomb structure, a regeneration limit value was measured by the following method. Results are shown in Table 1. The column of the regeneration limit value of Table 1 is divided for each predetermined number of repetition times, and the columns for the predetermined numbers of the repetition times are provided (1 time, 50 times, 100 times, 150 times, 200 times, 250 times, and 300 times). When a DPF is not divided into segments but the described number of the repetition times is reached, "a circle" is described in the column of the number of the repetition times. In a case where "the circle" is described in the previous column of the number of the repetition times and the DPF is divided before the next described number of the repetition times is reached, "a cross" is described in the corresponding column of the number of the repetition times.

(Regeneration Limit Value)

The honeycomb structure is used as the DPF, and regeneration (the burning of soot) is repeatedly performed with the equal amount of deposited soot, thereby confirming a limit at which the DPF is divided (the number of the repetition times (the times) when the filter is divided). First, a non-expandable mat made of a ceramic material as a holding material is wound around the outer periphery of the honeycomb structure, and the structure is disposed in a can member for canning made of SUS409, thereby obtaining a canning structure. Afterward, a burning gas indicating the soot formed by burning a diesel fuel light oil is allowed to flow into one end surface of the honeycomb structure, and is discharged from the other end surface thereof, whereby the soot is deposited in the honeycomb structure. Then, a temperature is once lowered to room temperature, the burning gas including oxygen at a constant ratio is allowed to flow into the one end surface of the honeycomb structure at 680° C., and the flow rate of the burning gas is decreased when the pressure loss of the honeycomb structure decreases, whereby the soot is immediately burnt and then the presence of the divided DPF is confirmed. This test is repeatedly performed until the dividing of the DPF or a ring-off-crack is recognized with a constant amount, that is, 8 g/L of deposited soot. The ring-off-crack is a crack having a circumferential direction near the center of the section of the DPF crossing the central axis direction at right angles.

TABLE 1

| | L/T (%) | Protruding wall thickness (mm) | \multicolumn{7}{c}{Regeneration limit value (times)} |
|---|---|---|---|---|---|---|---|---|---|
| | | | 1 | 50 | 100 | 150 | 200 | 250 | 300 |
| Example 1 | 95 | 0.15 | ○ | ○ | ○ | x | — | — | — |
| Example 2 | 95 | 0.2 | ○ | ○ | ○ | ○ | x | — | — |
| Example 3 | 95 | 1.0 | ○ | ○ | ○ | ○ | x | — | — |
| Example 4 | 95 | 1.5 | ○ | ○ | ○ | ○ | ○ | x | — |
| Example 5 | 95 | 2.0 | ○ | ○ | ○ | x | — | — | — |
| Example 6 | 75 | 0.15 | ○ | ○ | ○ | x | — | — | — |
| Example 7 | 75 | 0.2 | ○ | ○ | ○ | ○ | ○ | x | — |
| Example 8 | 75 | 1.0 | ○ | ○ | ○ | ○ | ○ | ○ | x |
| Example 9 | 75 | 1.5 | ○ | ○ | ○ | ○ | ○ | ○ | x |
| Example 10 | 75 | 2.0 | ○ | ○ | ○ | x | — | — | — |
| Example 11 | 50 | 0.15 | ○ | ○ | ○ | x | — | — | — |
| Example 12 | 50 | 0.2 | ○ | ○ | ○ | ○ | ○ | x | — |
| Example 13 | 50 | 1.0 | ○ | ○ | ○ | ○ | ○ | x | — |
| Example 14 | 50 | 1.5 | ○ | ○ | ○ | ○ | ○ | x | — |
| Example 15 | 50 | 2.0 | ○ | ○ | ○ | x | — | — | — |
| Example 16 | 10 | 0.15 | ○ | ○ | ○ | x | — | — | — |
| Example 17 | 10 | 0.2 | ○ | ○ | ○ | ○ | x | — | — |
| Example 18 | 10 | 1.0 | ○ | ○ | ○ | ○ | x | — | — |
| Example 19 | 10 | 1.5 | ○ | ○ | ○ | ○ | x | — | — |
| Example 20 | 10 | 2.0 | ○ | ○ | ○ | x | — | — | — |
| Example 21 | 5 | 0.15 | ○ | ○ | ○ | x | — | — | — |
| Example 22 | 5 | 0.2 | ○ | ○ | ○ | ○ | x | — | — |
| Example 23 | 5 | 1.0 | ○ | ○ | ○ | ○ | x | — | — |
| Example 24 | 5 | 1.5 | ○ | ○ | ○ | ○ | x | — | — |
| Example 25 | 5 | 2.0 | ○ | ○ | ○ | x | — | — | — |
| Example 26 | 3 | 0.15 | ○ | ○ | ○ | x | — | — | — |
| Example 27 | 3 | 0.2 | ○ | ○ | ○ | x | — | — | — |
| Example 28 | 3 | 1.0 | ○ | ○ | ○ | x | — | — | — |
| Example 29 | 3 | 1.5 | ○ | ○ | ○ | x | — | — | — |
| Example 30 | 3 | 2.0 | ○ | ○ | ○ | x | — | — | — |

TABLE 2

| | L/T (%) | Protruding wall thickness (mm) | \multicolumn{7}{c}{Regeneration limit value (times)} |
|---|---|---|---|---|---|---|---|---|---|
| | | | 1 | 50 | 100 | 150 | 200 | 250 | 300 |
| Example 31 | 95 | 0.15 | ○ | ○ | ○ | x | — | — | — |
| Example 32 | 95 | 0.2 | ○ | ○ | ○ | ○ | x | — | — |
| Example 33 | 95 | 1.0 | ○ | ○ | ○ | ○ | x | — | — |
| Example 34 | 95 | 1.5 | ○ | ○ | ○ | ○ | x | — | — |
| Example 35 | 95 | 2.0 | ○ | ○ | ○ | x | — | — | — |
| Example 36 | 75 | 0.15 | ○ | ○ | ○ | x | — | — | — |

TABLE 2-continued

| | L/T (%) | Protruding wall thickness (mm) | Regeneration limit value (times) | | | | | | |
|---|---|---|---|---|---|---|---|---|---|
| | | | 1 | 50 | 100 | 150 | 200 | 250 | 300 |
| Example 37 | 75 | 0.2 | o | o | o | o | x | — | — |
| Example 38 | 75 | 1.0 | o | o | o | o | o | x | — |
| Example 39 | 75 | 1.5 | o | o | o | o | o | x | — |
| Example 40 | 75 | 2.0 | o | o | o | x | — | — | — |
| Example 41 | 50 | 0.15 | o | o | o | x | — | — | — |
| Example 42 | 50 | 0.2 | o | o | o | o | o | x | — |
| Example 43 | 50 | 1.0 | o | o | o | o | o | x | — |
| Example 44 | 50 | 1.5 | o | o | o | o | o | x | — |
| Example 45 | 50 | 2.0 | o | o | o | o | x | — | — |
| Example 46 | 10 | 0.15 | o | o | o | o | x | — | — |
| Example 47 | 10 | 0.2 | o | o | o | o | x | — | — |
| Example 48 | 10 | 1.0 | o | o | o | o | x | — | — |
| Example 49 | 10 | 1.5 | o | o | o | o | x | — | — |
| Example 50 | 10 | 2.0 | o | o | o | o | x | — | — |
| Example 51 | 5 | 0.15 | o | o | o | o | x | — | — |
| Example 52 | 5 | 0.2 | o | o | o | o | x | — | — |
| Example 53 | 5 | 1.0 | o | o | o | o | x | — | — |
| Example 54 | 5 | 1.5 | o | o | o | o | x | — | — |
| Example 55 | 5 | 2.0 | o | o | o | o | x | — | — |
| Example 56 | 3 | 0.15 | o | o | o | o | x | — | — |
| Example 57 | 3 | 0.2 | o | o | o | o | x | — | — |
| Example 58 | 3 | 1.0 | o | o | o | o | x | — | — |
| Example 59 | 3 | 1.5 | o | o | o | o | x | — | — |
| Example 60 | 3 | 2.0 | o | o | o | o | x | — | — |
| Comparative Example 1 | 100 | — | o | o | x | — | — | — | — |

Examples 2 to 60

Honeycomb structures were prepared in the same manner as in Example 1 except that the thickness of each protruding wall and a ratio (100×L/T(%)) of "a distance L between the tip of the protruding wall and the closest portion of an adjacent honeycomb segment" to "a distance T between a honeycomb segment provided with the protruding walls and the adjacent honeycomb segment" were varied as shown in Table 1 or 2. Regeneration limit values were measured in the same manner as in Example 1. Results are shown in Tables 1, 2.

Comparative Example 1

As a ceramic material, SiC powder and metal Si powder were mixed at a mass ratio of 80:20, and auxiliary forming materials such as methyl cellulose and hydroxypropoxymethyl cellulose, pore formers such as starch and a water-absorbing resin, a surfactant and water were added to the resultant mixture, followed by kneading, to prepare a kneaded clay by a vacuum clay kneader.

The resultant columnar kneaded clay was formed into a honeycomb shape by use of an extrusion forming machine, high-frequency dielectric heating drying was performed, drying was performed by using a hot air drier at 120° C. for two hours, and both end surfaces of the resultant dried article were cut as much as predetermined amounts, thereby obtaining a formed honeycomb article which had a partition wall thickness of 310 μm and a cell density of 46.5 cells/cm² (300 cells/square inch) and which had a rectangular parallelepiped shape with a 36 mm square and a length of 155 mm. It is to be noted that any protruding wall was not formed on the side surface of a formed honeycomb article. 16 formed honeycomb articles were prepared.

As to each resultant formed honeycomb article, the ends of the adjacent cells on opposite sides were plugged, and the ends of the cells were plugged so that both the end surfaces of the article had a checkered pattern. A material similar to that of the formed honeycomb article was used in a filling material for plugging.

After the plugging, each formed and plugged honeycomb article was dried by using a hot air drier at 120° C. for five hours, degreased in the atmosphere at about 450° C. for five hours by use of an atmospheric furnace provided with a deodorizing device, and then fired in an Ar inactive atmosphere at about 1450° C. for five hours, thereby obtaining plugged honeycomb segments in which Sic crystal particles combined with one another by Si. The resultant honeycomb segments had an average pore diameter of 13 μm and a porosity of 41%. The average pore diameter was a value measured by a mercury porosimeter, and the porosity was a value measured by Archimedes process.

The resultant 16 honeycomb segments were joined together by using a joining machine, to prepare one large rectangular parallelepiped joined article (147 mm square×a length of 155 mm). The outer periphery of the resultant joined article was roughly processed and ground, thereby obtaining a cylindrical honeycomb structure having a bottom surface diameter of 145 mm and a length of 155 mm in a central axis direction. As described above, a regeneration limit value (times) was obtained in the same manner as in Example 1. Results are shown in Table 2.

It is seen from Tables 1, 2 that in a case where protruding walls are disposed in buffer portions, the regeneration limit value is larger as compared with a case where any protruding wall is not disposed. Moreover, the protruding walls protrude into the buffer portions, which produces the noticeable effects of the present invention that the development of cracks generated in the buffer portions and the dividing of the honeycomb structure can be prevented.

A manufacturing method of a honeycomb structure of the present invention can preferably be utilized in a carrier for a catalyst device, or a filter which is used for environmental protection, the collection of a specific substance or the like in various fields of chemistry, power, steel and the like.

What is claimed is:
1. A honeycomb structure comprising:
 a plurality of honeycomb segments arranged adjacent to one another so that side surfaces of the honeycomb segments face each other with a predetermined distance being left therebetween;
 a plurality of buffer portions disposed between the adjacent honeycomb segments to join the honeycomb segments together; and
 an outer peripheral portion disposed on the outermost periphery of the plurality of joined honeycomb segments, wherein
 each honeycomb segment comprises:
  partition walls separating and forming a plurality of cells functioning as fluid passages and extending from one end surface of each segment to the other end surface thereof, and
  protruding walls which are extensions of the partition walls that protrude beyond a periphery of the honeycomb segment formed by the side surfaces of the honeycomb segment.
2. The honeycomb structure according to claim 1, wherein in a section crossing the central axis direction at right angles, a distance between the tip of each protruding wall and the closest portion of the adjacent honeycomb segment is in a range of 5 to 95% of a distance between the honeycomb segment provided with the protruding walls and the adjacent honeycomb segment.

3. The honeycomb structure according to claim 1, wherein each of the protruding walls has a thickness of 0.2 to 1.5 mm.

4. The honeycomb structure according to claim 2, wherein each of the protruding walls has a thickness of 0.2 to 1.5 mm.

5. The honeycomb structure according to claim 1, wherein the opening ends of the predetermined cells on one side of each honeycomb segment and the opening ends of the remaining cells on the other side thereof have plugging portions.

6. The honeycomb structure according to claim 2, wherein the opening ends of the predetermined cells on one side of each honeycomb segment and the opening ends of the remaining cells on the other side thereof have plugging portions.

7. The honeycomb structure according to claim 3, wherein the opening ends of the predetermined cells on one side of each honeycomb segment and the opening ends of the remaining cells on the other side thereof have plugging portions.

8. The honeycomb structure according to claim 4, wherein the opening ends of the predetermined cells on one side of each honeycomb segment and the opening ends of the remaining cells on the other side thereof have plugging portions.

9. The honeycomb structure according to claim 1, wherein the number of protruding walls is 50% or more of the total number of partition walls.

* * * * *